United States Patent

Kamiguchi et al.

Patent Number: 5,585,199
Date of Patent: Dec. 17, 1996

[54] MAGNETORESISTANCE EFFECT HEAD

[75] Inventors: Yuzo Kamiguchi, Yokohama; Susumu Hashimoto, Ebina; Hitoshi Iwasaki, Yokosuka; Yuichi Ohsawa, Tokyo; Masashi Sahashi, Yokohama, all of Japan

[73] Assignee: Kabushiki Kaisha Toshiba, Kanagawa-ken, Japan

[21] Appl. No.: 303,014

[22] Filed: Sep. 8, 1994

[30] Foreign Application Priority Data

Sep. 9, 1993 [JP] Japan ................. 5-224786

[51] Int. Cl.$^6$ ................. H01F 1/00; G11B 21/00
[52] U.S. Cl. ................. 428/621; 428/611; 428/928; H01F/1/00; G11B/21/00
[58] Field of Search ................. 428/611, 635, 428/621, 670, 672, 673, 674, 675, 678, 668, 928, 686; 360/113

[56] References Cited

U.S. PATENT DOCUMENTS

| | | | |
|---|---|---|---|
| 5,134,533 | 7/1992 | Friedrich et al. | 360/113 |
| 5,159,513 | 10/1992 | Dieny et al. | 360/113 |
| 5,277,991 | 1/1994 | Satomi et al. | 428/611 |
| 5,287,238 | 2/1994 | Baumgart et al. | 360/113 |
| 5,366,815 | 11/1994 | Araki et al. | 428/611 |

OTHER PUBLICATIONS

"A Magnetoresistive Readout Transducer", Hunt, R. P., IEEE Transactions on Magnetics, vol. MAG-7, No. 1, pp. 150–154, Mar. 1971.

"Giant Magnetoresistance of (001)Fe/(001)Cr Magnetic Superlattices", Baibich et al., Physical Review Letters, vol. 61, No. 21, pp. 2472–2475, Nov. 21, 1988.

"Oscillations in Exchange Coupling and Magnetoresistance in Metallic Superlattice Structures: Co/Ru, Co/Cr, and Fe/Cr", Parkin et al., Physical Review Letters, vol. 64, No. 19, pp. 2304–2307, May 7, 1990.

"Novel magnetoresistance effect in layered magnetic structures: Theory and experiment", Barnas et al., Physical Review B, vol. 42, No. 13, pp. 8110–8120, Nov. 1, 1990.

"Magnetotransport properties of magnetically soft spin-valve structures (invited)", Dieny et al., J. Appl. Phys., vol. 69, No. 8, pp. 4774–4779, Apr. 15, 1991.

"Nonoscillatory magnetroesistance in Co/Cu/Co layered structures with oscillatory coupling", Speriosu et al., Physical Review B, vol. 44, No. 10, pp. 5358–5361, Sep. 1, 1991.

"Giant magnetoresistance of magnetically soft sandwiches: Dependence on temperature and on layer thickness", Dieny et al., Physical Review B, vol. 45, No. 2, pp. 806–813, Jan. 1, 1992.

J. Mathon, "Theory of magnetic multilayers. Exhange interactions and transport properties", Journal of Magnetism and Magnetic Materials 100 (1991), pp. 527–543.

Primary Examiner—David A. Simmons
Assistant Examiner—Linda L. Gray
Attorney, Agent, or Firm—Finnegan, Henderson, Farabow, Garrett & Dunner, L.L.P.

[57] ABSTRACT

A magnetoresistance effect head is disclosed which is provided with a spin valve film of the three-layer laminate construction comprising a pair of magnetic layers made of a Co-based alloy and a nonmagnetic intermediate layer interposed between the pair of magnetic layers. This magnetoresistance effect head satisfies the expressions, $3 \leq d_1 \leq 7$, $3 \leq d_2 \leq 7$, and $0 \leq (d_1-d_2)/d_1 \leq 0.40$, wherein $d_1$ and $d_2$ stand for the thicknesses (nm) of the pair of magnetic layers (providing $d_1 \geq d_2$). A soft magnetic layer of high resistance is disposed contiguously to that of the pair of magnetic layers which has the direction of magnetization thereof varied by an external magnetic layer. The total thickness of this soft magnetic layer and the magnetic layer contiguous thereto is in the range of from 5 to 40 nm. In the case of a magnetoresistance effect head which is provided with a spin valve film of the five-layer laminate construction, the thicknesses (nm), $d_1$ and $d_2$, of the two outer magnetic layers similarly satisfy the conditions mentioned above. Further, the thickness (nm), $d_3$, of the center magnetic layer satisfies the expression, $1 \leq d_3 \leq \frac{2}{3} d_1$. As a result, the magnetoresistance effect head acquires the ability to produce a large rate of change of magnetic resistance with high repeatability.

16 Claims, 8 Drawing Sheets

MAGNETORESISTANCE EFFECT HEAD

BACKGROUND OF THE INVENTION

1. Field of the Invention

This invention relates to a magnetoresistance effect head provided with a spin valve film.

2. Description of the Related Art

Generally, the reading of information recorded in a magnetic recording medium is accomplished by a method which comprises imparting a relative motion between a magnetic read head furnished with a coil and the recording medium and detecting the voltage induced electromagnetically in the coil in consequence of the relative motion. It has been known to attain the reading of information otherwise by the use of a magnetoresistance effect head (hereinafter referred to as "MR head") [refer to IEEE MAG-7,150 (1971), for example].

The MR head operates by virtue of the phenomenon that the electric resistance of a certain kind of ferromagnetic body varies with the intensity of an external magnetic field and has already found recognition as a highly sensitive head usable for a magnetic recording medium. In recent years, the trend of magnetic recording media toward decrease in size and increase in capacity has been resulting in a growing decrease of the relative speed between the magnetic read head and the magnetic recording medium during the course of the reading of information. Under the circumstances, the expectation of a MR head which is capable of deriving a large output even at a small relative speed has been swelling.

Heretofore, the so-called Permalloy, i.e. a Ni-Fe alloy, has been used for the part of a MR head which senses an external magnetic field and varies the resistance of itself in response thereto (hereinafter referred to as "MR element"). The Permalloy type alloys, however, are such that the rates of change of magnetoresistivity thereof are up to about 3% at most even when they are possessed of ideal soft magnetic properties. For the MR element in the magnetic recording medium which has undergone decrease in size and increase in capacity, therefore, the Permalloy type alloys offer no sufficient rate of change of magnetoresistivity. Thus, the desirability of developing a material displaying highly sensitive magnetoresistivity fit for a MR element has been finding widespread recognition.

In answer to the demand for an ideal MR element material, it has been ascertained that the so-called artificial lattice film, i.e. a multilayer film obtained by alternately superposing ferromagnetic metal films and nonmagnetic metal films such as, for example, Fe/Cr or Co/Cu, under certain conditions fit for the purpose of antiferromagnetically coupling adjacent ferromagnetic metal films in the laminate, exhibits gigantic magnetoresistance effect. The observation of an artificial lattice film displaying a large ratio of change of magnetoresistance change ratio exceeding even the maximum of 100% has been reported (refer to Phys. Rev. Left., Vol. 61, 2474 (1988) and Phys. Rev. Left., Vol. 64, 2304 (1990), for example). The artificial lattice films, however, are unfit for MR elements because of their unduly high saturation magnetic fields.

The fact that large magnetoresistance effect is realized with a multilayer film of the sandwich construction of ferromagnetic film/nonmagnetic film/ferromagnetic film in spite of the absence of an antiferromagnetic coupling of adjacent ferromagnetic films has been reported. Specifically, one of the two ferromagnetic films opposed to each other across an interposed nonmagnetic film is magnetized fast by means of an exchange bias and the other ferromagnetic film is magnetically inverted by means of an external magnetic field. As a result, large magnetoresistance effect is obtained in the multilayer film by changing the relative angle of the directions of magnetization of the two ferromagnetic films opposed to each other across the nonmagnetic film. The multilayer film of this type is called a spin valve film (refer to Phys. Rev. B., Vol. 45, 806 (1992), J. Appl. Phys., Vol. 69, 4774 (1991), for example). Though the spin valve films have smaller magnetoresistance change ratio than the artificial lattice films, they fit MR elements because they are magnetized to saturation in a low magnetic field. The MR heads using these spin valve films have a very bright prospect of justifying their utility in practical applications.

Incidentally, in the spin valve film which has the sandwich construction, its magnetoresistance change ratio depends to a great extent particularly on the thickness of the magnetic layer formed of ferromagnetic films because the part thereof in which the magnetoresistance effect manifests itself has a small total film thickness and the scatter of electrons on the surface of MR element contributes greatly to the occurrence of the phenomenon. In the manufacture of a MR effect head using the spin valve film, therefore, the selection of a material for the magnetic layer and the setting of thickness of the film prove to be important. No specific guideline, however, has been drawn to date with respect to the material of the magnetic layer and the thickness of the film. Under the circumstances, therefore, a spin valve film construction which is capable of manifesting large magnetoresistance change ratio with satisfactory repeatability remains yet to be developed. The MR head using a spin valve film has not yet been developed enough to justify its utility in practical applications.

In the meantime, the magnetic recording media have been rapidly advancing in terms of the growth of recording density and the exaltation of linear recording density has been advancing proportionately. To attain effective reading of signal magnetic fields, the MR head must be possessed of enhanced linear resolution. In the MR head of the popular shield type, the linear resolution can be heightened by decreasing the distance (gap) between the shield layer and the MR element. When the decrease of the gap is exclusively resorted to, however, the rate of change of magnetic resistance offered by the spin valve film is inevitably impaired. Thus, the desirability of developing a MR element using a spin valve film which displays improved linear resolution and, at the same time, produces a large magnetoresistance change ratio with high repeatability has been finding widespread recognition.

SUMMARY OF THE INVENTION

An object of this invention, therefore, is to provide a magnetoresistance effect head which realizes production of a large magnetoresistance change ratio with high repeatability by the use of a spin valve film. Another object of this invention is to provide a magnetoresistance effect head using a spin valve film which acquires enhanced linear resolution and, at the same time, allows production of a large rate of change of magnetoresistance change ratio with high repeatability.

The first magnetoresistance effect head according to this invention is characterized by comprising a spin valve film of the three-layer laminate construction composed of a pair of magnetic layers made of a magnetic alloy containing at least Co and a nonmagnetic intermediate layer interposed between the pair of magnetic layers, wherein said pair of magnetic layers satisfy the expressions, $3 \leq d_1 \leq 7$, $3 \leq d_2 \leq 7$, and $0 \leq (d_1-d_2)/d_1 \leq 0.40$, are satisfied, wherein $d_1$ and $d_2$ stand for the thicknesses (nm) of the pair of magnetic layers (providing $d_1 \geq d_2$).

The second magnetoresistance effect head according to the present invention is characterized by comprising a spin valve film of the three-layer laminate construction composed of a pair of magnetic layers made of a magnetic alloy containing at least Co and a nonmagnetic intermediate layer interposed between the pair of magnetic layers and a soft magnetic layer having higher resistance than the magnetic layers and disposed contiguously to that of the pair of magnetic layers which has the direction of magnetization thereof varied by an external magnetic field, wherein said pair of magnetic layers satisfy the expressions, $1 \leq d_1 7$, $1 \leq d_2 \leq 7$, $0 \leq (d_1-d_2)/d_1 \leq 0.40$, and $5 \leq d_f \leq 40$, are satisfied, wherein $d_1$ and $d_2$ stand for the thicknesses (nm) of the pair of magnetic layers (providing $d_1 \geq d_2$) and $d_f$ stands for the total thickness (nm) of the soft magnetic layer and the magnetic layer contiguous to the soft magnetic layer.

The third magnetoresistance effect head according to this invention is characterized by comprising a spin valve film of the five-layer laminate construction composed of three magnetic layers made of a magnetic alloy containing at least Co and two nonmagnetic intermediate layers interposed alternately between the three magnetic layers, wherein said three magnetic layers satisfy the expressions, $3 \leq d_1 \leq 7$, $3 \leq d_2 \leq 7$, and $0 \leq (d_1-d_2)/d \leq 0.40$, are satisfied, wherein $d_1$ and $d_2$ stand for the thicknesses (nm) of the two outermost of the three magnetic layers (providing $d_1 \geq d_2$). Further, the third magnetoresistance effect head is characterized by the fact that it satisfies the expression, $1 \leq d_3 \leq \frac{2}{3} d_1$, wherein $d_3$ stands for the thickness (nm) of the innermost of the three magnetic layers.

The magnetoresistance effect head comprising the spin valve film of the three-layer laminate construction obtains a large magnetoresistance change ratio (hereinafter referred to as "MR change ratio") with high repeatability by forming the pair of magnetic layers with a magnetic alloy containing Co and fixing the thicknesses of the pair of magnetic layers so as to satisfy the expressions, $3 \leq d_1 \leq 7$, $3 \leq d_2 \leq 7$, and $0 \leq (d_1-d_2)/d_1 \leq 0.40$.

This magnetoresistance effect head enables a regenerating head to acquire an increase in linear resolution, produce a large MR change ratio, and further enjoy improved sensitivity when a soft magnetic layer of high resistance is formed contiguously to that of the pair of magnetic layers mentioned above which has the direction of magnetization varied by an external magnetic field and, at the same time, the total thickness [$d_f$ (nm)] of the soft magnetic layer and the magnetic layer contiguous thereto satisfies the expression, $5 \leq d_f \leq 40$. In this case, the thickness of the pair of magnetic layers may be in the range of from 1 to 7 nm.

The magnetoresistance effect head comprising the spin valve film of the five-layer laminate construction produces a large MR change ratio with high repeatability when the magnetic layers are formed of a magnetic alloy containing Co and the thicknesses (nm) of the two outermost of the magnetic layers are so fixed as to satisfy the expressions, $3 \leq d_1 \leq 7$, $3 \leq d_2 \leq 7$, and $0 \leq (d_1-d_2)/d_1 \leq 0.40$. It produces a still larger rate of MR with high repeatability when the thickness of the innermost of the magnetic layers ($d_3$) is so set to satisfy the expression, $1 \leq d_3 \leq \frac{2}{3} d_1$. Further details of these magnetoresistance effect heads will be described in the embodiments to be described herein below.

DESCRIPTION OF THE PREFERRED EMBODIMENTS

Now, this invention will be described more specifically below with reference to working examples of this invention.

Figure 1:
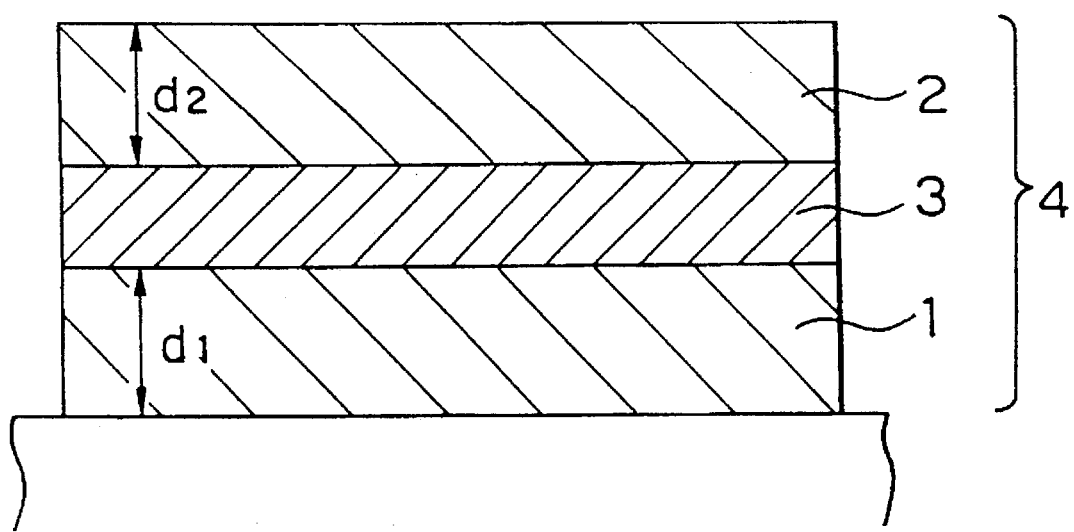
FIG. 1 is a cross section showing the construction of the essential part of a MR head as the first embodiment of this invention.

FIG. 1 is a cross section showing the essential part of a magnetoresistance effect head (MR head) according to the first embodiment of this invention. In the diagram, 1 and 2 stand for a pair of magnetic layers, 3 for a nonmagnetic intermediate layer interposed between the magnetic layers 1 and 2, and 4 for a spin valve film of the three-layer laminate construction using the three layers.

One of the pair of magnetic layers 1 and 2 is magnetized fast in consequence of the impartation thereto of a bias magnetic field. The other magnetic layer has the magnetization thereof inverted by an external magnetic field. Thus, the spin valve film 4 acquires magnetoresistance effect by the change in the relative angle of the directions of magnetization of the two magnetic layers 1 and 2 which are opposed to each other across the nonmagnetic intermediate layer 3. The impartation of the bias magnetic field to one of the magnetic layers is attained, for example, by causing an antiferromagnetic layer formed as of a FeMn film or NiO film or a hard ferromagnetic layer formed as of a CoPt film to be closely approximated to or superposed on the magnetic layer.

The magnetic layers 1 and 2 mentioned above are made of a magnetic alloy containing at least Co and the thicknesses (nm), $d_1$ and $d_2$, of these magnetic layers 1 and 2 satisfy the expressions, $3 \leq d_1 \leq 7$, $3 \leq d_2 \leq 7$, and $0 \leq (d_1-d_2)/d_1 \leq 0.40$ (providing $d_1 \geq d_2$).

It has been known that the magnetoresistance effect produced in the spin valve film is generally caused by the bulk effect due to the scattering dependent on spin in the magnetic layer and the interfacial effect due to the scattering dependent on spin in the interfaces between the superposed layers [Physical Review B 42, pp 8110–8120 (1990)]. The magnitude of the interfacial effect mentioned above is expressed by the ratio of the probabilities with which up-spin electrons and down-spin electrons penetrate the interfaces without being subjected to inelastic scattering. The bulk effect is expressed by the ratio of mean free paths of up-spin electrons and down-spin electrons in the magnetic layers.

In the MR head of the first embodiment, the magnetic layers 1 and 2 are formed of a magnetic alloy containing at least Co in consideration of the influences of the bulk effect and the interfacial effect. Specifically, the bulk effect and the interfacial effect act synergistically on magnetoresistance effect so that the MR change ratio will increase in accordance as the two effects gain in magnitude.

Figure 2:
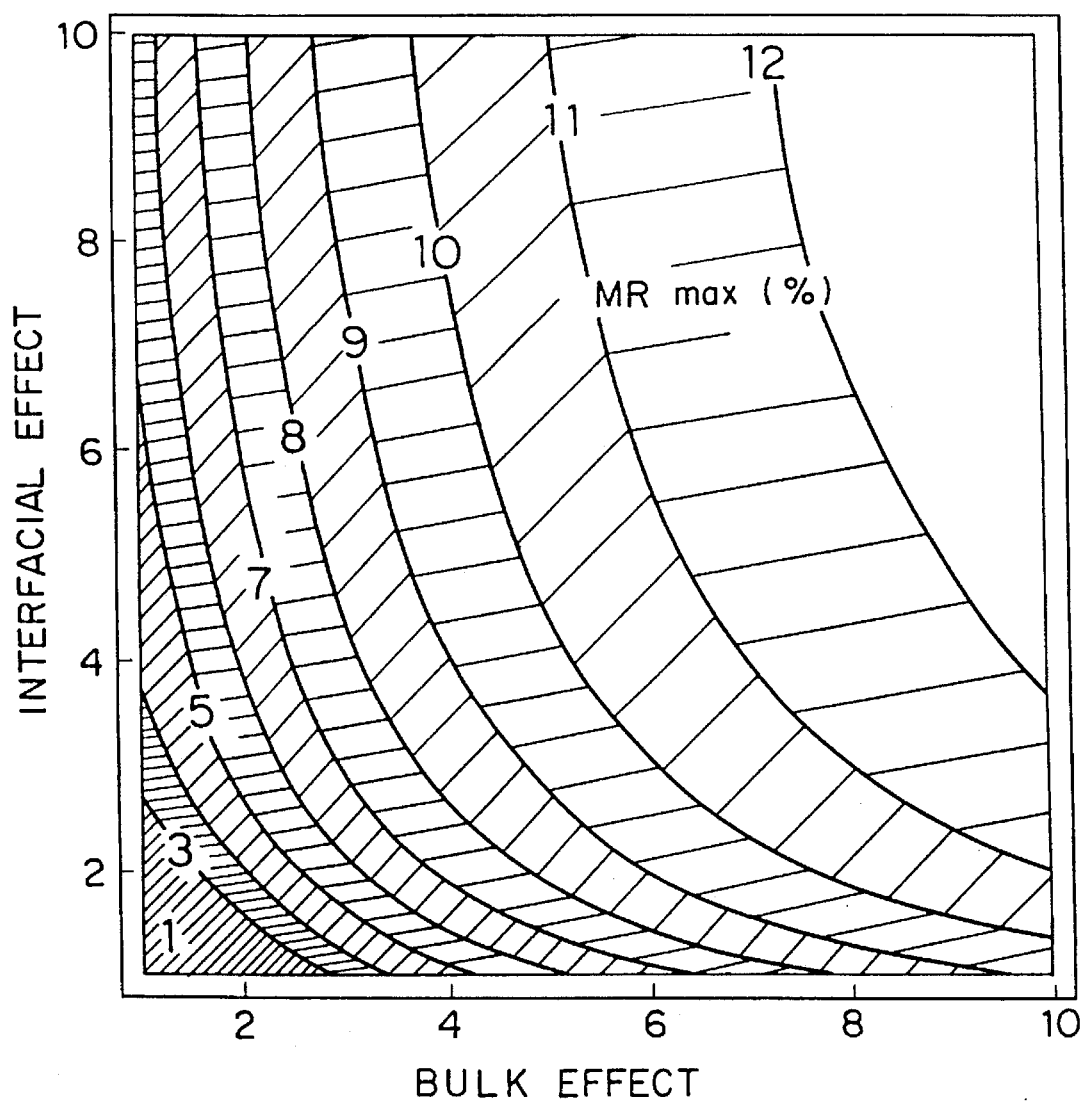
FIG. 2 is a contour plan showing the dependency of the MR change ratio on the bulk effect and the interfacial effect.

FIG. 2 is a characteristic diagram showing in the form of contour lines the maximum values of MR change ratio obtained by suitably adjusting the composition of the material for the magnetic layer and the thickness of film, with the magnitudes of the bulk effect and the interfacial effect as parameters. The maximum values of the MR change ratio shown in the diagram have been obtained by varying the thicknesses of a pair of magnetic layers in the spin valve film of the three-layer laminate construction while keeping the ratio of the thicknesses of the magnetic layers at 1 : 1 and regulating the magnitudes of the bulk effect and the interfacial effect with the composition of a CoFe alloy used as the material for the magnetic layers.

It is noted from FIG. 2 that a sufficiently large MR change ratio is obtained only when the bulk effect and the interfacial effect are both appreciably large. No satisfactory magnetoresistance effect is obtained when only either of the bulk effect and the interfacial effect is large. In the spin valve film of the three-layer or the five-layer laminate construction, when Co which as an elemental metal produces a larger MR change ratio than when Fe or Ni is used exclusively for the magnetic layers, the produced spin valve film cannot be expected to produce a very large MR change ratio because the interfacial effect is then suffered to preponderate. When Co is combined with Fe, Ni, or another element, the MR change ratio is markedly increased because the bulk effect can be exalted. In view of all these factors, the present invention contemplates forming the magnetic layers 1 and 2 of a Co-based magnetic alloy combined with Fe, Ni, or other element.

The requirement imposed on the material for forming the magnetic layers 1 and 2 is simply that it should be such a Co-based magnetic alloy as has been mentioned above. For the sake of exalting the bulk effect and ensuring production of a large MR change ratio, it is desirable to use Fe as the element for addition to the Co-based alloy under consideration. Besides Fe, one or more elements selected from the group consisting of Ni, Au, Ag, Cu, Pd, Pt, Ir, Rh, Ru, Os, and Hf may be used for the purpose of this addition. The amount of the element thus added is desired to be in the range of from 5 to 50 at %, preferably from 8 to 20 at %. The reason for this particular range is that no sufficient increase is obtained in the bulk effect if the amount of the element added is unduly small and the interfacial effect is possibly decreased notably if the amount is unduly large.

Figure 3:
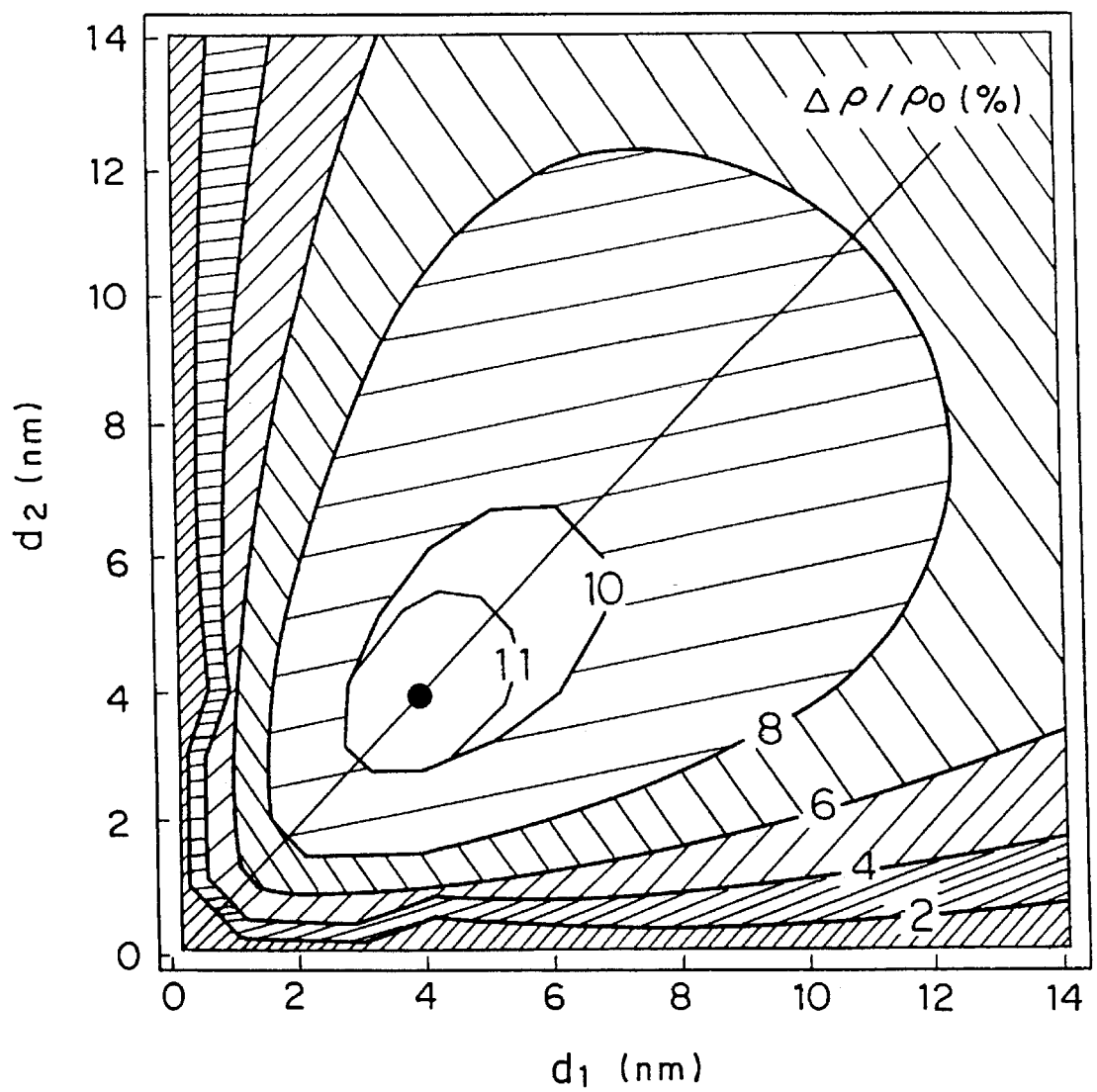
FIG. 3 is a contour plan showing the dependency of the MR change ratio on the thickness of magnetic layer.

The thicknesses of the two magnetic layers 1 and 2 may be set independently of each other. For the purpose of maximizing the MR change ratio, however, it is important that these thicknesses should be severally optimized. The present inventors have continued a study in search of the optimum values of the thicknesses of the two magnetic layers 1 and 2 and have been consequently ascertained that the spin valve film acquires a large MR change ratio when the ratio of the thicknesses of the two magnetic layers approximates 1: 1. FIG. 3 is a diagram showing in the form of contour lines typical results of the analysis of the MR change ratio as a function of the thicknesses of the two magnetic layers 1 and 2. In the analysis, the thickness of the nonmagnetic intermediate layer 3 (Cu layer) was fixed at 2 nm and the thicknesses, $d_1$ and $d_2$, of the two magnetic layers 1 and 2 made of $Co_{90}Fe_{10}$ and opposed to each other across the nonmagnetic layer 3 were varied.

FIG. 3 illustrates that the curves have their peaks indicative of large rates of MR change $(\Delta_\rho/\rho_0)$ where the two magnetic layers 1 and 2 have equal (1 : 1) thicknesses. This is because the manner of scatter of electrons in the spin valve film varies across the interfaces of the magnetic layers with the nonmagnetic intermediate layer and the largest magnetoresistance effect is obtained when the interfaces fall at the center of thickness of the spin valve film. At times, the head construction may be such as to necessitate a change in the ratio of the thicknesses of the two magnetic layers. Even in this case, a large MR change ratio can be obtained by confining the difference between the thicknesses of the two magnetic layers within 40%. To be more specific, the large MR change ratio can be obtained by setting the thicknesses (nm), $d_1$ and $d_2$, of the magnetic layers 1 and 2 so as to satisfy the condition, $0 \leq (d_1-d_2)/d_1 \leq 0.40$. It is more desirable to confine the difference between the thicknesses of the magnetic layers 1 and 2 within 20%. It is most desirable to set the ratio of the thicknesses of the magnetic layers 1 and 2 at 1: 1.

It is further illustrated in FIG. 3 that large rates of MR change are obtained when the thicknesses of the magnetic layers 1 and 2 fall in the range of from 3 to 7 nm. Various problems arise when the thicknesses of the magnetic layers 1 and 2 deviate from this range. If the thicknesses are less than 3 nm, for example, the film formation will not be easily attained as required. If they exceed 7 nm, the diamagnetic field between the magnetic layers 1 and 2 will possibly produce an effect of inducing a bulk noise. Preferably, the thicknesses of the magnetic layers 1 and 2 are not less than 3 nm and less than 5 nm. Larger rates of MR change are obtained when the thicknesses are within this range. Incidentally, FIG. 3 represents the data of the rates of MR change obtained in the magnetic materials made of $Co_{90}Fe_{10}$. Even when other Co-based alloys are used as materials for the magnetic layers, the optimum values of the thicknesses are virtually the same.

For the reasons enumerated above, the MR head according to the first embodiment uses a spin valve film 4 of the three-layer laminate construction wherein the magnetic layers 1 and 2 are formed of a Co-based magnetic alloy, the thicknesses of the magnetic layers 1 and 2 are limited within the range of from 3 to 7 nm, and the difference between the thicknesses of the two magnetic layers is confined within 40%. As a result, the MR head produces a large MR change ratio with high repeatability.

The nonmagnetic intermediate layer 3 which is interposed between the two magnetic layers 1 and 2 is constructed of a paramagnetic material, diamagnetic material, antiferromagnetic material, or spin glass. As concrete examples of the materials usable therefor, Cu, Au, and Ag and paramagnetic alloys of these metals with magnetic elements, antiferromagnetic alloys such as FeMn, NiMn, CoMn, PtMn, and PdMn, and Pd and Pt and alloys having these metals as main components thereof may be cited. Here, the thickness of the nonmagnetic intermediate layer 3 is desired to be in the range of from 1 to 4 nm, preferably from 2 to 3 nm. If the thickness of the nonmagnetic intermediate layer 3 exceeds 4 nm, the produced spin valve film will fail to obtain sufficient sensitivity to change of resistance. Conversely, if it is less than 1 nm, then the spin valve film will encounter difficulty in obtaining an ample decrease in the exchange bond between the magnetic layers 1 and 2.

For the MR head in the first embodiment described above, the motion of electrons in the spin valve film 4 in the direction perpendicular to the surface of the film constitutes an important factor. If crystal grain boundaries are copiously present in the direction of thickness of the film, the electrons will be scattered therein and the magnetoresistance will be consequently decreased. Thus, the diameters of the crystal grains in the spin valve film 4 are desired to be larger than the total thickness of the spin valve film 4. If the diameters of the crystal grains are unduly large, however, the Co-based ferromagnetic alloy, if any, used in the spin valve film 4 will manifest heavy magnetic anisotropy. An extreme increase of the diameters of the crystal grains, therefore, must be avoided. The diameters of the crystal grains, accordingly, are desired to be not more than 30 nm.

For the purpose of controlling the diameters of the crystal grains of the spin valve film 4 as described above, it suffices to form as an undercoating layer for the spin valve film 4 a buffer layer having a thickness larger than the total thickness of the spin valve film 4 and not more than 30 nm. It is generally known that during the initial growth of a thin film, the diameters of crystal grains of the film approximate the thickness of the film. When the buffer layer (undercoating layer) of such a thickness as mentioned above is formed, the diameters of the crystal grains will surpass the overall thickness of the spin valve film to be produced subsequently. By having the spin valve film 4 superposed on this buffer layer, therefore, the diameters of the crystal grains of the buffer layer can be controlled so as to equal or exceed the overall thickness of the spin valve film 4.

Now, the second embodiment, of the present invention will be explained below with reference to FIG. 4.

Figure 4:
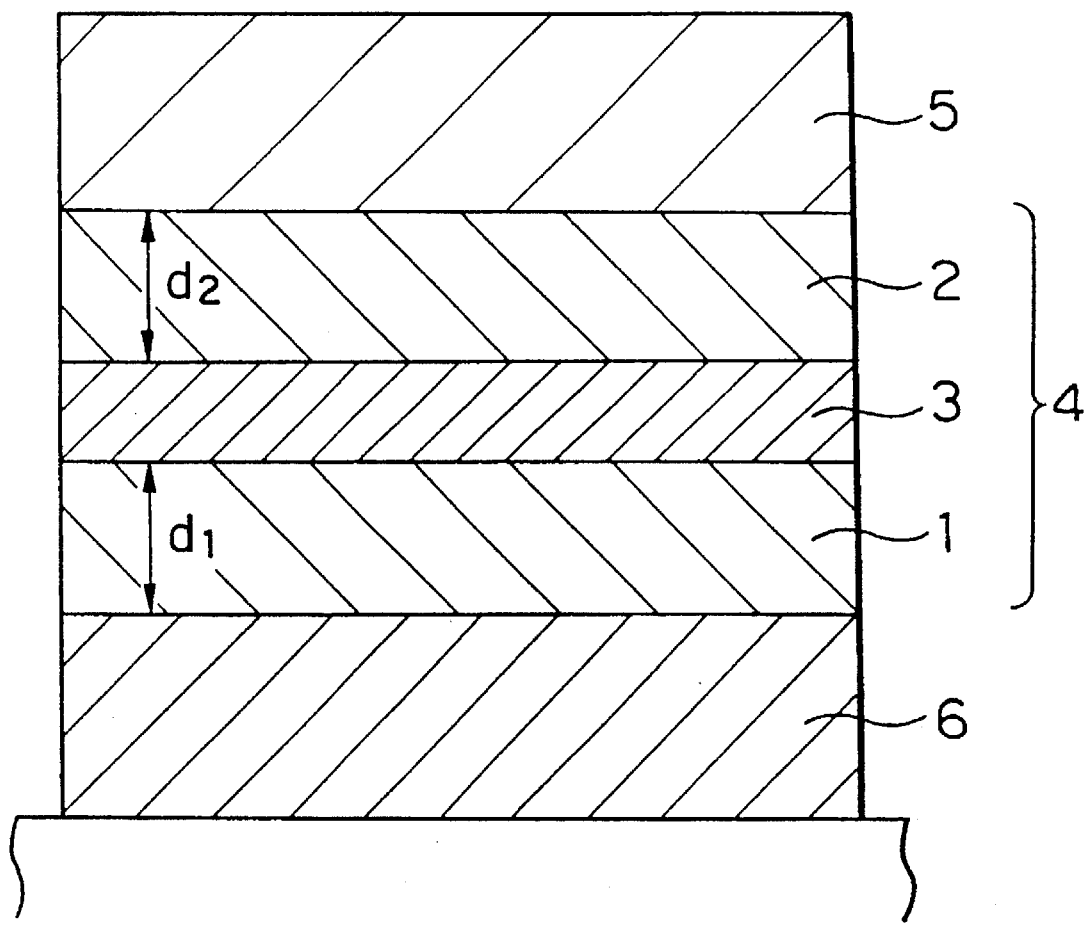
FIG. 4 is a cross section showing the construction of the essential part of a MR head as the second embodiment of this invention.

The MR head the essential part of which is shown in FIG. 4, similarly to that of the first embodiment, is provided with the spin valve film 4 of the three-layer laminate construction which comprises magnetic layers 1 and 2 made of a Co-based magnetic alloy and a nonmagnetic intermediate layer 3 interposed between the magnetic layers 1 and 2. The magnetic layer 2 out of the pair of magnetic layers 1 and 2 is formed contiguously with an antiferromagnetic layer 5 so as to be magnetized fast. The other magnetic layer 1, namely the magnetic layer the direction of magnetization of which is varied by an external magnetic field (signal magnetic field) (hereinafter referred to as "magnetic layer for detection of the signal magnetic field") 1, is formed contiguously to a soft magnetic layer 6 of high resistance.

Figure 5:
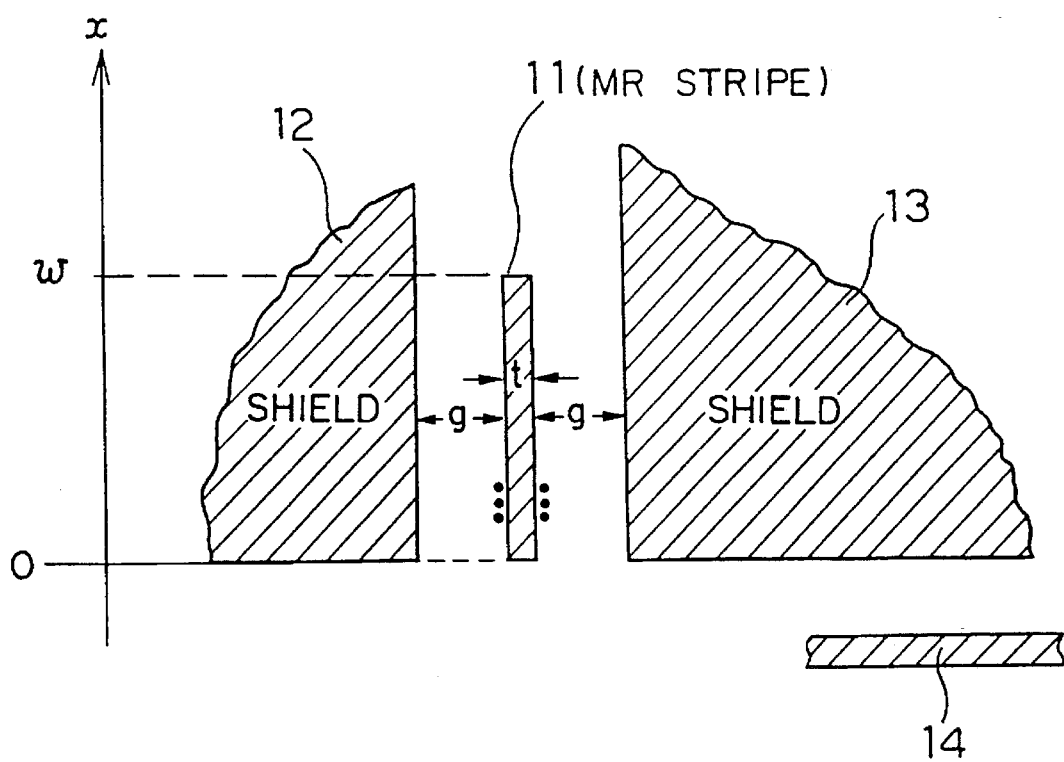
FIG. 5 is a cross section showing in the form of a model the construction of a shield type MR head.

The materials for forming the magnetic layers 1 and 2 and the nonmagnetic intermediate layer 3, the thickness of the nonmegnetic intermediate layer 3, etc. are identical to those of the first embodiment described above. For the impartation of a bias magnetic field to the magnetic layer 2, the same method as used in the first embodiment described above can be adopted in addition to a method which resides in forming the magnetic layer 2 contiguously to the antiferromagnetic layer 5.

Where the spin valve film is used for the MR head, the practice of interposing a MR element 11 formed of the spin valve film between shield films 12 and 13 as shown in FIG. 5 for the purpose of enhancing the linear resolution of information written in a magnetic medium in the direction of track length generally prevails. In this case, the magnetic flux from a magnetic recording medium 14 invades either or both of the magnetic layers in the spin valve film. The rate of change of resistance increases in proportion as the amount of the signal magnetic flux grows. It is known that the magnitude of this signal magnetic flux can be expressed by the following formula.

$$\phi_{(x)} = \{\phi_0/(\sinh w/\lambda) \cdot \sinh\{w-x\}/\lambda\} \quad (1)$$

wherein, as shown in the diagram, x stands for the coordinate of the spin valve film with respect to the stripe thereof in the direction of the invasion of a magnetic flux, with the end face of stripe opposed to the magnetic recording medium 14 as the origin, w for the length (depth) of the stripe of the spin valve film in the direction of the invasion of a magnetic flux, and $\phi_0$ for the amount of invasion of the signal magnetic flux at x=0. The magnitude of $\phi_0$ is determined by the positional relation between the magnetic recording medium 14 and the MR element 11 and does not depend on that of w. The factor $\lambda$ is called a characteristic length and is expressed by the following formula.

$$\lambda = \sqrt{\mu_r t g/2} \quad (2)$$

wherein $\mu_r$ stands for the specific permeability of the magnetic layer, t for the invading thickness of the magnetic flux in the magnetic layer, and g for the gap.

Figure 6:
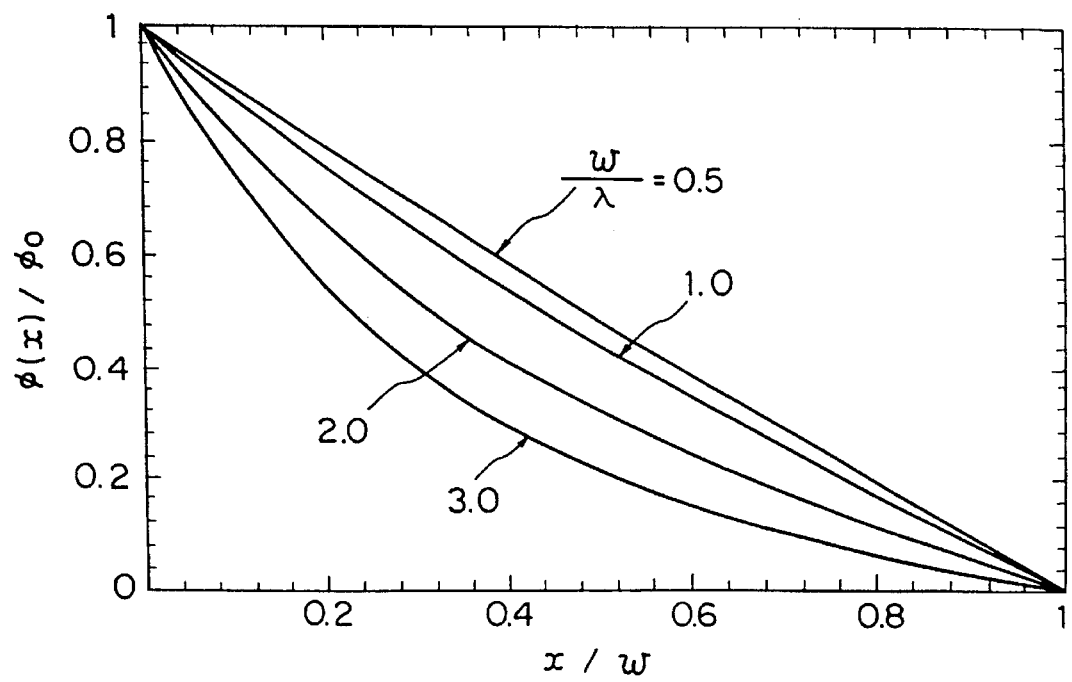
FIG. 6 is a diagram showing the dependency of the state of invasion of signal magnetic flux in the shield type MR head on the ratio of stripe depth w/characteristic length $\lambda$.

The formula (1) permits mathematical determination of the question on how the factor $\phi_{(x)}$ is affected by the change of the stripe depth w of the spin valve film relative to the characteristic length $\lambda$. The data obtained by multiplying w/$\lambda$ by 0.5, 1, 2, and 3 are shown in FIG. 6. In the graph, the horizontal axis is the scale of the stripe depth w of the spin valve film and the vertical axis the scale of the factor $\phi_0$.

It is remarked from FIG. 6 that the amount of the signal magnet flux $\phi$ is rapidly attenuated by the growth of w/$\lambda$ as evinced by downward convexes of curves. It is clear from the data that particularly when the stripe depth w of the spin valve film is greater than the characteristic length $\lambda$, namely when the relation of w/$\lambda$>1 exists, the sensitivity is inevitably lowered because the mean amount of signal magnetic flux $\phi_{mean}$ for the entirety of the MR element decreases and the amount of resistance is decreased. Thus, the stripe depth w is desired to be smaller than the characteristic length $\lambda$.

In spite of these data, the fact remains that the recording density of magnetic recording media has been quickly heightening and the linear recording density proportionately growing. For signals of this nature to be read effectively, it is necessary that the linear resolution should be exalted. It has become increasingly necessary, therefore, to shorten the gap g between the shield layers 12 and 13 and the MR element 11 for the sake of enhancing the linear resolution of the regenerating head. Thus, the trend of the characteristic length $\lambda$ is toward steady decrease. From the viewpoints of the technique for fabrication, the reliability thereof, etc., the stripe depth w of the spin valve film is desired to be not less than 0.5 μm, preferably not less than 1 μm. As a natural consequence, the characteristic length $\lambda$ is desired to be not less than 0.5 μm, preferably not less than 1 μm.

For the purpose of increasing the characteristic length $\lambda$ in addition to decreasing the gap g, two methods are conceivable as may be noted from the formula (2). The first method resides in enlarging the specific permeability $\mu_r$ of the magnetic layers. The magnitude of the specific permeability is inherent in the material to be used for the magnetic layers and has its own limit. For the purpose of fully anticipating the future decrease of the gap g, therefore, the approach which resorts exclusively to the increase of the specific permeability $\mu_r$ has its own limit.

The second method consists in increasing the thickness t of the magnetic layer which is open to the invasion by the magnetic flux. For this purpose, the magnetic layer which is destined to suffer the invasion by the magnetic flux is desired to have a thickness of not less than 5 nm, preferably not less than 10 nm. To obtain a large MR change ratio, however, it is necessary that the thicknesses of the two magnetic layers of the spin valve film should be optimized and, at the same time, the difference between the thicknesses of the two magnetic layers should be decreased (specifically to or below 40%).

To satisfy the two conditions just mentioned, the MR head of the present embodiment has the soft magnetic layer 6 of high resistance disposed contiguously to the magnetic layer 1 which is selected out of the two magnetic layers 1 and 2 of the spin valve film 4 of the three-layer laminate construction as shown in FIG. 4 and adapted for detecting the signal magnetic field. By causing the magnetic layer 1 for the detection of a signal magnetic field to be disposed contiguously to the soft magnetic layer 6 as described above and consequently allowing these two layers to form a magnetic exchange bond and have the directions of magnetization thereof jointly varied by an external magnetic field (signal magnetic field), the thickness t of the magnetic layer open to the invasion by the magnetic flux can be increased without requiring the difference between the thicknesses of the two magnetic layers 1 and 2 to be decreased and the thickness of the magnetic layer 1 for the detection of the signal magnetic field to be increased. As a result, the gap g can be decreased and, at the same time, the characteristic length $\lambda$ can be increased and the stripe depth w which is set in consideration of the technique for fabrication and the reliability thereof is allowed to be shorter than the characteristic length $\lambda$. Further, since the soft magnetic layer 6 has high resistance, the MR change ratio is not notably lowered by an increase of the thickness, t, of the magnetic layer open to the invasion by a magnetic flux unlike the deviation of the thickness of the magnetic layer 1 from the optimum range thereof due to a mere increase thereof.

Since the electric current could split and thrust into the soft magnetic layer 6 in spite of the high resistance inherent therein if the thickness of the soft magnetic layer 6 is unduly large, the total thickness, $d_f$, of the soft magnetic layer 6 and the magnetic layer 1 for the detection of the signal magnetic field is required to be not more than 40 nm. For the purpose of enabling the characteristic length $\lambda$ to be large as described above, the total thickness $d_f$ is desired to be not less than 5 nm, preferably not less than 10 nm. It is optional with the manufacturer to have the soft magnetic layer 6 exclusively so shaped as to protrude from the surface thereof opposed to the magnetic recording medium and have the magnetic layer 1 for the detection of a signal magnetic field recessed from the surface thereof opposed to the magnetic recording medium. In this case, the thickness of the soft magnetic layer 6 is desired to be not less than 5 nm.

Further, since the soft magnetic layer 6 concurrently functions as a buffer layer, it goes to exalt the crystallinity of the spin valve film 4 in its entirety. As a result, the lower limit of the thicknesses of the magnetic layers 1 and 2 can be set at 1 nm. When the soft magnetic layer 6 is disposed closely in contact with the magnetic layer 1 for the detection of the signal magnetic field, therefore, the thickness of the two magnetic layers 1 and 2 can be selected in the range of from 1 to 7 nm, preferably from 3 to 5 nm. As regards the difference between the thicknesses of the two magnetic layers 1 and 2, the thicknesses $d_1$ and $d_2$ are required to satisfy the expression, $0 \leq (d_1-d_2)/d_1 \leq 0.40$ (providing $d_1 \geq d_2$), for the same reason as exists in the first embodiment described above. The difference between the thicknesses of the two magnetic layers 1 and 2 is desired to be not more than 20%. Most desirably, the thicknesses of the two magnetic layers 1 and 2 are such that the ratio thereof will be 1 : 1. The thickness of the magnetic layer 1 for the detection of the signal magnetic field is denoted as $d_1$ in FIG. 4 for the sake of convenience. Naturally, the thickness of the magnetic layer 2 which is magnetized fast may be denoted as $d_1$ instead.

As the material for the construction of the soft magnetic layer 6, it is desirable particularly to use a soft magnetic substance of the fcc crystal structure for the sake of exalting the crystallinity of the film to be formed. When a soft magnetic substance of a crystal structure other than the fcc crystal structure is used instead, it is desirable to fabricate the soft magnetic layer 6 in the form of a laminate film including a soft magnetic substance of a fcc crystal structure and have the magnetic layer 1 for the detection of the signal magnetic field disposed contiguously to the soft magnetic film of the fcc crystal structure. Incidentally, when the soft magnetic layer 6 is in the form of a laminated film as described above, the signal magnetic field-detecting magnetic layer 1 side film which happens to be made of a material manifesting no soft magnetism while in the form of an aggregate of loose particles poses no particular problem so long as the film is given an extremely decreased thickness and consequently vested with soft magnetism enough for the soft magnetic layer 6 and the magnetic layer 1 for the detection of the signal magnetic field to vary the directions of magnetization thereof jointly. Further, the soft magnetic layer 6 is desired to have specific resistance of not less than 100 $\mu\Omega\cdot$cm. This specific resistance is capable of precluding the electric current from being split and thrust into the soft magnetic layer 6. As concrete examples of the material which is desirably used for the construction of the soft magnetic layer 6, therefore, NiFe alloys and NiFeCo alloys, the alloys obtained by adding such additive elements as Ti, V, Cr, Mn, Zn, Nb, Mo, Tc, Hf, Ta, W, and Re to the magnetic alloys mentioned above which are soft magnetic materials of the fcc crystal structure and consequently vested with heightened resistance, and the alloys obtained by adding the same additive elements to Co and vested with an amorphous texture may be cited. Here, the amorphous magnetic alloys which have been furnished with amorphism as described above and microcrystalline magnetic alloys generally possess high resistance.

From the reasons given above, the MR head of the second embodiment uses a spin valve film 4 of the three-layer laminate construction wherein the magnetic layers 1 and 2 are formed with a Co-based magnetic alloy, the thicknesses of the magnetic layers 1 and 2 are selected in the range of from 1 to 7 nm, and the difference between the thickness of the two magnetic layers 1 and 2 is confined within 40%. Further, the soft magnetic layer 6 of high resistance is formed contiguously to the magnetic layer 1 and the total thickness of the magnetic layer 1 and the soft magnetic layer 6 is set in the range of from 5 to 40 nm. Thus, the MR head of the second embodiment realizes the optimization of the thicknesses of the two magnetic layers 1 and 2, the production of a large MR change ratio due to the small difference between the two thicknesses, and the exaltation of sensitivity due to the fact that the stripe depth w is enabled to be smaller than the characteristic length $\lambda$ by additionally forming the soft magnetic layer 6 and consequently increasing the thickness, t, of the magnetic layer open to the invasion by the magnetic flux. It is also enabled to acquire linear resolution amply commensurate with the steady growth in the recording density of the magnetic recording medium.

In the second embodiment described above, the diameters of the crystal grains of the spin valve film 4 are desired to be larger than the total thickness of the spin valve film 4 and not more than 30 nm for the same reason as exists in the first embodiment.

Now, another embodiment of this invention will be described below with reference to FIG. 7.

Figure 7:
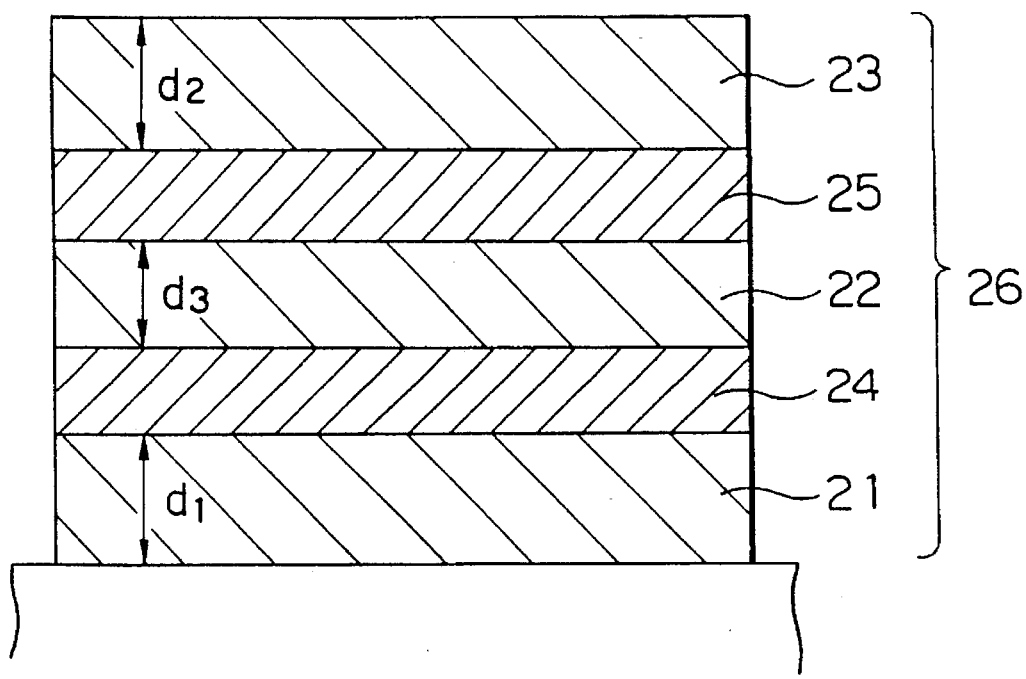
FIG. 7 is a cross section showing the construction of the essential part of a MR head as the third embodiment of this invention.

A MR head shown in FIG. 7 is possessed of a spin valve film 26 of the five-layer laminate construction wherein non-magnetic intermediate layers 24 and 25 are interposed alternately between three magnetic layers 21, 22, and 23. The two outermost magnetic layers 21 and 23 are magnetized fast as by being disposed closely to or superposed directly on an antiferromagnetic layer and a hard ferromagnetic layer which are omitted from illustration in the diagram. The MR head acquires magnetoresistance effect because the center magnetic layer 22 has the magnetization thereof inverted by an outer magnetic field and the relative angles formed between the direction of magnetization of the center magnetic layer 22 interposed between the nonmagnetic intermediate layers 24 and 25 and the directions of magnetization of the two outermost magnetic layers 21 and 23 are proportionately varied.

For the same reason as exists in the MR head of the first embodiment described previously, the MR head of the embodiment under consideration is enabled to produce a large MR change ratio with high repeatability by selecting the thicknesses, $d_1$ and $d_2$, of the two outermost magnetic layers 21 and 23 in the range of from 3 to 7 nm and confining the difference between the thicknesses of these magnetic layers within 40%. Preferably, the thicknesses of the two magnetic layers 21 and 23 are not less than 3 nm and less than 5 nm. More desirably, the difference between the thicknesses of the two magnetic layers 21 and 23 is not more than 20%. Ideally, the thicknesses of the two magnetic layers 21 and 23 are such that the ratio thereof will be 1: 1. The material for the magnetic layers, the material for the non-magnetic intermediate layer, and the thicknesses of these layers are desired to be equal to those of the first embodiment described previously. The same remarks hold good for the other conditions.

Further, the thickness, $d_3$, of the center magnetic layer 22 of the spin valve film 26 of the five-layer laminate construction is desired to be not more than two thirds of each of the thicknesses of the two outermost magnetic layers 21 and 23 and, when the thicknesses, $d_1$ and $d_2$, of the outermost magnetic layers 21 and 23 are different as in the case of $d_1 > d_2$, for example, is desired to be not more than two thirds of the thickness, $d_1$. By setting the thicknesses of the component layers as described above, the MR head is enabled to acquire a large MR change ratio with greater certainty. This is because the manner of scatter of electrons in the spin valve film varies across the interfaces between the magnetic layers and the nonmagnetic intermediate layer and because the largest magnetoresistance effect is obtained when the interfaces fall at the center of thickness of the spin valve film.

To be specific, the production by the MR head of a large MR change ratio is ensured by enabling the center magnetic layer 22 to have a smaller thickness than the two outermost magnetic layers 21 and 23 thereby causing the interfaces formed by the magnetic layers 21, 22, and 23 with the nonmagnetic intermediate layers 24 and 25 to approximate closely the center of thickness of the spin valve film 26. Specifically, the large MR change ratio is obtained when the thickness of the center magnetic layer 22 is not more than two thirds of either of the thicknesses of the two outermost magnetic layers 21 and 23. If the thickness of the center magnetic layer 22 is unduly small, the magnetic properties of the center magnetic layer 22 will be degraded as by interfacial diffusion and the phenomenon of magnon will tend to occur and result in lowering the MR change ratio. To avoid this disadvantage, it is important that the thickness of the center magnetic layer 22 should be not less than 1 nm.

In the MR heads of the first, the second, and the third embodiments described above, the opposite surfaces of the spin valve film of the three-layer or the five-layer laminate construction are each desired to be in contact with a film or superposed films made of one member selected from the group consisting of antiferromagnetic substances, ferrimagnetic substances, oxides, semiconductors, Cu alloys, Au alloys, Cr alloys, Mn alloys, Ti alloys, Ta alloys, amorphous metals, microcrystalline metals, and the alloys formed by adding Ti, V, Cr, Mn, Zn, Nb, Mo, Tc, Hf, Ta, W, Re, etc. to magnetic alloys or to be exposed to the ambient air.

Desirably in this case, a film which is made of such metal, alloy, semiconductor, oxide, insulator, amorphous metal, microcrystalline metal, etc. as is possessed of particularly high resistance may be exclusively superposed parallelly with the spin valve film. By this arrangement, the MR head is enabled to read the rate of change of resistance with high efficiency because the greater part of electric current is caused to flow through the spin valve film part of the MR head. Optionally, an electrode layer or a shunt layer made of material other than the material mentioned above may be superposed on the spin valve film. In this case, the overall surface electric conductivity of the film of the laminate construction is desired to be not more than $20 \times 10^{-2 \Omega -1}$·square for the purpose of enabling electric current to flow efficiently through the spin valve film part of the MR head. The reason for this upper limit is that the spin valve film will be robbed of its own electric current by some other layer and will consequently suffer decrease of the magnetoresistance effect if the surface electric conductivity exceeds this upper limit.

Now, concrete examples of the MR heads of the embodiments described above will be explained below together with the results of their evaluation.

EXAMPLE 1

Figure 8:
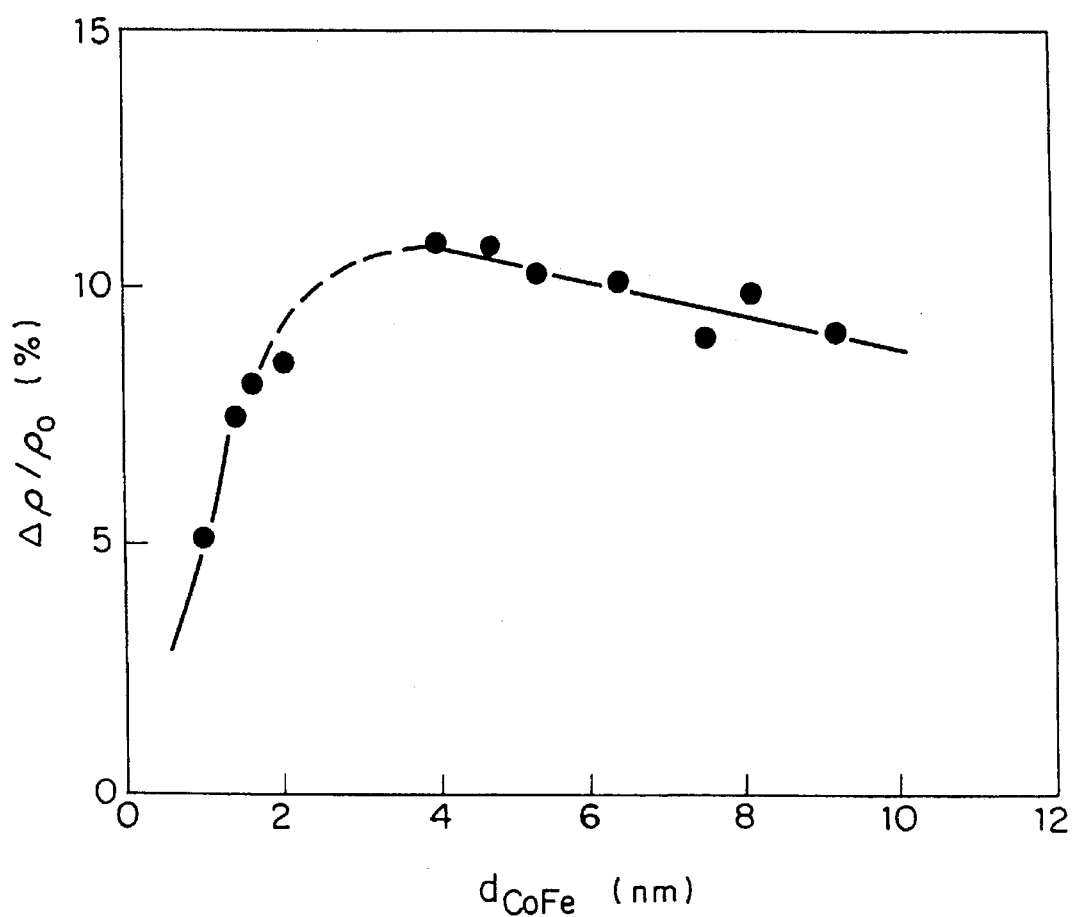
FIG. 8 is a characteristic diagram showing the dependency of the MR change ratio of the spindle valve film in one embodiment of this invention on the thickness of magnetic film.

A MR element possessed of a spin valve film of a three-layer laminate construction was formed by having $Co_{90}Fe_{10}$ ($d_{CoFe}$ nm)/Cu (2.2 nm)/$Co_{90}Fe_{10}$ ($d_{CoFe}$ nm)/ $Fe_{50}Mn_{50}$ (15 nm) sequentially superposed by the spattering method on a sapphire substrate while suitably varying the thicknesses of the magnetic layers. The samples thus obtained were tested for dependency of the MR change ratio on the thicknesses of the magnetic layers. The results are shown in FIG. 8. The $Fe_{50}Mn_{50}$ layer was superposed on the adjoining $Co_{90}Fe_{10}$ layer for the purpose of imparting to the latter layer magnetic anisotropy of a fixed direction.

It is clear from FIG. 8 that in the present example, the maximum MR change ratio of 11% was obtained when the thickness (=$d_{CoFe}$) of the magnetic layer was 4 nm and that amply large rates of MR change were obtained when the thickness of the magnetic layer was in the range of from 3 to 7 nm. The data indicate that in the spin valve film using a Co-based magnetic alloy, the optimum thickness of magnetic layer is in the range of from 3 to 7 nm and that for the MR head, it is advantageous to use a spin valve film provided with magnetic layers of such a thickness as is in the range mentioned above.

EXAMPLE 2

A MR element possessed of a spin valve film of a three-layer laminate construction was obtained by having $Co_{90}Fe_{10}/Cu/Co_{90}Fe_{10}/Fe_{50}Mn_{50}$ sequentially superposed by the spattering method on a thermally oxidized Si substrate while suitably varying the thicknesses of the magnetic layers. Then, a MR head was produced by subjecting the spin valve film to a patterning treatment. The $Fe_{50}Mn_{50}$ layer was superposed on the adjoining $Co_{90}Fe_{10}$ magnetic layer for the purpose of imparting to the latter layer magnetic anisotropy of a fixed direction. The thickness of this layer is desired to be in the range of from 5 to 20 nm. The thickness of the Cu layer can be suitably selected in the range of from 1.5 to 3.5 nm.

The MR head of the construction described above obtained a MR change ratio of 10% when the two $Co_{90}Fe_{10}$ magnetic layers each had a thickness of 5 nm and the Cu layer (nonmagnetic intermediate layer) had a thickness of 2.2 nm. In contrast thereto, a comparative sample using a Cu layer of the same thickness of 2.2 nm and two magnetic layers of an increased thickness of 15 nm obtained only a small MR change ratio of 5%. The reason for this deficiency in the MR change ratio is that the magnetic layers of the sample had an unduly large thickness as compared with the optimum thickness. Another comparative sample using two magnetic layers of different thicknesses of 5 nm and 10 nm obtained only a small MR change ratio of 6%. The reason for this deficiency in the rage of MR change is that the inequality of thickness of the two magnetic layers caused the interfaces of the magnetic layers with the nonmagnetic intermediate layer to deviate from the center of the spin valve film and prevented the virtue of magnetoresistance effect from being effectively utilized.

EXAMPLE 3

First, a shield layer of CoNbZr 1.5 µm thick was formed on a Si substrate and an alumina film 0.1 µm thick was formed as a gap layer thereon. Then, a MR element possessed of a spin valve film of a three-layer laminate construction was produced by having CoNbZr ($d_f$ nm)/NiFe (2 nm)/$Co_{90}Fe_{10}$ ($d_1$ nm)/Cu (2.5 nm)/$Co_{90}Fe_{10}$ ($d_2$ nm)/$Fe_{50}Mn_{50}$ (8 nm) sequentially superposed thereon while suitably varying the thicknesses of the magnetic layers. The spin valve film was patterned to form stripe depths of 1 µm therein and Cu electrodes were formed on the stripes as spaced with an interval of 2 µm. Further thereon, an alumina film 0.1 µm thick as a gap layer and a shield layer of CoNbZr 1.5 µm thick were formed.

Here, the $Fe_{50}Mn_{50}$ layer was superposed on the adjoining $Co_{90}Fe_{10}$ magnetic layer for the purpose of imparting to the latter layer magnetic anisotropy of a fixed direction. The NiFe layer was interposed between the CoNbZr layer and the $Co_{90}Fe_{10}$ layer for the purpose of exalting the crystallinity of the spin valve film in its entirety.

In the MR head of the construction described above, when the thicknesses, $d_1$ and $d_2$, of the two $Co_{90}Fe_{10}$ magnetic layers were fixed each at 4 nm and the thickness, $d_f$ of the CoNbZr layer was fixed at 10 nm, the spin valve film on being exposed to a large magnetic field exerted by an external electromagnet showed a MR change ratio of 9%. This value is slightly small as compared with the MR change ratio of 11% shown by a spin valve film incorporating therein neither a CoNbZr layer of soft magnetism nor a NiFe layer and having undergone no patterning. This small value may be ascribed to the joint effect of the CoNbZr layer and the NiFe layer which was manifested in splitting electric current and to the deterioration of the film by the patterning. The incorporation of the CoNbZr soft magnetic layer and the NiFe layer, however, enabled the characteristic length to reach 1.2 µm, a size greater than the stripe depth of the spin valve film.

When the MR head of the construction described above was incorporated in a hard disk device and was tested for actual output voltage, it showed a rated output per track width of 1,500 ($\mu V_{pp}$/µm) at a sense current of 10 mA because of ample invasion by a magnetic flux. This output surpasses by far the output which is normal for the conventional MR head.

In an experiment intended for the sake of comparison with this invention, a MR head was produced by faithfully imitating the construction of the present working example while keeping the thickness, $d_f$, of the CoNbZr layer at the same size of 10 nm and increasing the thicknesses, $d_1$ and $d_2$, of the two $Co_{90}Fe_{10}$ layers to 15 nm. When this comparative MR head was exposed to a magnetic field exerted by an external electromagnet and tested for the MR change ratio produced in the spin valve film, it was found to produce only a small MR change ratio of 4%. This is because the thickness of the actual magnetic layers was unduly large as compared with the optimum thickness of magnetic layers. When this MR head was incorporated in a hard disk device and tested for actual output voltage, it showed a rated output per track width of only 700 ($\mu V_{pp}$/µm) at a sense current of 10 mA. This is because the ratio of MR change was inherently small in spite of the satisfactory invasion by the magnetic flux.

In another experiment intended for comparison with this invention, a MR head was produced by imitating the construction of the example described above while keeping the thickness, $d_f$, Of the CoNbZr layer unchanged from 10 nm and unequalizing the thicknesses of the two $Co_{90}Fe_{10}$ magnetic layers, namely setting the thickness, $d_1$, of the CoNbZr layer side $Co_{90}Fe_{10}$ magnetic layer at 5 nm and the thickness, $d_2$, of the $Fe_{50}Mo_{50}$ layer side $Co_{90}Fe_{10}$ magnetic layer at 10 nm. When the MR head of this comparative experiment was tested in a large magnetic field applied by an external electromagnet, the spin valve film thereof was found to have only a small MR change ratio of 5%. This is because the inequality of thickness between the two magnetic layers caused the interfaces of the magnetic layers with the nonmagnetic intermediate layer to deviate from the center of the spin valve film and the magnetoresistance effect could no longer be effectively utilized. When this MR head was incorporated in a hard disk device and tested for actual output voltage, it barely showed a rated output per track width of 700 ($\mu W_{pp}$/µm) at a sense current of 10 mA. This is because the MR head inherently had a low MR change ratio in spite of satisfactory invasion by a magnetic flux.

In yet another experiment performed for referential purpose, a MR head was produced by imitating the construction of the example described above while omitting the incorporation of the CoNbZr layer and the FiFe layer. When this MR head was tested in a large magnetic field applied by an external electromagnet, the spin valve film thereof was found to produce a large MR change ratio of 10%. The characteristic length was inevitably as small as 0.4 µm, however, because the magnetic layer open to the invasion by a magnetic flux had such a small thickness as 4 nm and also because the $Co_{90}Fe_{10}$ magnetic layer had low permeability as compared with that of the CoNbZr layer. When this MR head was incorporated in a hard disk device and tested for actual output voltage, it should a rated output per track width of 1,000 ($\mu V_{pp}/\mu m$) at a sense current of 10 mA. This is because fully satisfactory invasion by a magnetic flux was no longer allowed to occur.

Another MR head was produced by imitating the construction of the example described above while changing the material of the soft magnetic layer (10 nm) to $(Ni_{80}Fe_{20})_{90}Cr_5Nb_5$. This MR head showed a MR change ratio of 10% and a characteristic length of 1.5 μm and, in the state incorporated in a hard disk device, manifested a rated output of 2,000 ($\mu V_{pp}/\mu m$).

EXAMPLE 4

A MR element possessed of a spin valve film of a five-layer laminate construction was produced by having $(Ni_{80}Fe_{20})_{90}Nb_{10}/Fe_{50}Mn_{50}/Co_{90}Fe_{10}/Cu/Co_{90}Fe_{10}/Cu/Co_{90}Fe_{10}/Fe_{50}Mn_{50}$ sequentially superposed by the sputtering method on a thermally oxidized Si substrate while suitably changing the thicknesses of the magnetic layers. Then, the MR element was transformed into a MR head by the patterning treatment.

Here, the $Fe_{50}Mn_{50}$ layers were superposed on the adjoining $Co_{90}Fe_{10}$ magnetic layers for the purpose of imparting to each of the latter layers magnetic anisotropy of a fixed direction. They are desired to have thicknesses in the range of from 5 to 20 nm. The $(Ni_{80}Fe_{20})_{90}Nb_{10}$ layer on the thermally oxidized Si substrate was intended as a buffer layer for conferring a fcc structure on the adjoining $Fe_{50}Mn_{50}$ layer and causing this layer to function as an antiferromagnetic layer. A ferromagnetic material of a fcc structure is suitably used for the buffer layer and, for the purpose of acquiring heightened electric resistance, is desired to contain such an additive element as Nb. The buffer layer mentioned above is desired to have a thickness in the range of from 5 to 20 nm.

In the present spin valve film of a five-layer laminate construction, magnetic anisotropy of a fixed direction is imparted to each of the two outer $Co_{50}Fe_{10}$ layers. As a result, the spin valve film acquires the property of magnetoresistance because the center magnetic layer alone is allowed to change the direction of magnetization thereof to the direction of an external magnetic field in a low magnetic field and the relative angle of the directions of magnetization of the outer magnetic layer and the center magnetic layer is varied by the external magnetic field.

The MR head of the construction described above acquired a MR change ratio of 25% when the thicknesses of the two outer magnetic layers were fixed equally at 5 nm, the thickness of the center magnetic layer at 2 nm, and the thicknesses of the two Cu layers equally at 2 nm. In contrast thereto, the MR head having the thickness of the center magnetic layer increased to 5 nm produced only such a low MR change ratio as 18%. This is because the addition to the thickness of the center magnetic layer resulted in deviating the interfaces between the magnetic layers and the nonmagnetic intermediate layer from the center of the spin valve film. Further, the MR head having the thicknesses of the two outer magnetic layers increased equally to 20 nm while keeping the thickness of the center magnetic layer unchanged from 2 nm and the thicknesses of the two Cu layers unchanged from 2 nm obtained only such a small MR change ratio as 14%. This is because the outer magnetic layers had unduly large thicknesses as compared with the optimum thickness. Then, the MR head having the thicknesses of the two outer magnetic layers set unequally at 5 nm and 10 nm while keeping the thickness of the center magnetic layer unchanged from 2 nm and the thicknesses of the two Cu layers unchanged from 2 nm produced such a low MR change ratio as 16%. This is because the inequality of the thicknesses of the outer magnetic layers caused the interfaces of the magnetic layers and the nonmagnetic intermediate layers to deviate from the center of the spin valve film.

When the spin valve film of the five-layer laminate construction described above is used in the MR head, the central magnetic layer may be enabled to function as an independent domain by inducing a weak exchange bond between the two outer magnetic layers and the central magnetic layer through the medium of the nonmagnetic intermediate layer. The impartation of this function may be attained otherwise by utilizing an external bias magnetic field while keeping the exchange bond at a low level. Further, the material for the outer magnetic layers and that for the center magnetic layer do not need to be identical. At times, they may be different.

Incidentally, for the MR heads of the various examples cited above, the directions in which the magnetic anisotropy is imparted to the magnetic layers as by $Fe_{50}Mn_{50}$ are not critical. They may be parallel or perpendicular to the signal magnetic field.

It is clearly noted from the examples cited above that the magnetoresistance effect head according to this invention has the ability to produce a large magnetoresistance change ratio with high repeatability.

What is claimed is:

1. A magnetoresistance effect head comprising:
   a spin valve film having a laminate construction consisting of three layers and including:
   a first magnetic layer having a thickness $d_1$,
   a second magnetic layer having a thickness $d_2$, one of said first and second magnetic layers having a direction of magnetization varied by an external magnet, and
   a nonmagnetic intermediate layer interposed between said first and second magnetic layers; and
   a soft magnetic layer disposed contiguous with said one of said first and second magnetic layers, said soft magnetic layer having a higher resistance than said one of said first and second magnetic layers,
   wherein said first and second magnetic layers are made of a magnetic Co-alloy, said one of said first and second magnetic layers and said soft magnetic layer have a total thickness of $d_f$, and the following expressions are satisfied: 1 nm$\leq d_1 \leq$7 nm, 1 nm$\leq d_2$7 nm, $d_1 \geq d_2$, $0 \leq (d_1-d_2)/d_1 \leq 0.40$, and 5 nm$\leq d_f \leq$40 nm.

2. A magnetoresistance effect head according to claim 1, wherein said soft magnetic layer and said one of said first and second magnetic layers form a magnetic exchange coupling.

3. A magnetoresistance effect head according to claim 1, wherein said spin valve film has a characteristic length greater than a stripe depth thereof.

4. A magnetoresistance effect head according to claim 1, wherein said soft magnetic layer has specific resistance of not less than 100 μΩcm.

5. A magnetoresistance effect head according to claim 1, wherein said first and second magnetic layers satisfy the expressions 3 nm$\leq d_1 <$5 nm and 3 nm$\leq d_2 <$5 nm.

6. A magnetoresistance effect head according to claim 1, wherein
   said first and second magnetic layers are made of a Co-based magnetic alloy containing at least one member selected from the group consisting of Fe, Ni, Au, Ag, Cu, Pd, Pt, Ir, Rh, Ru, Os, and Hf at a ratio in the range of from 5 to 50 at %.

7. A magnetoresistance effect head according to claim 1, wherein said spin valve film includes crystal grains having a diameter larger than a total thickness of said spin valve film and not more than 30 nm.

8. A magnetoresistance effect head according to claim 1, wherein said nonmagnetic intermediate layer has a thickness in the range of from 1 to 4 nm.

9. A magnetoresistance effect head according to claim 1, wherein said first and second magnetic layers do not form an antiferromagnetic coupling.

10. A magnetoresistance effect head according to claim 1, wherein another of said one of said first and second magnetic layers is magnetized fast.

11. A magnetoresistance effect head according to claim 1, wherein said soft magnetic layer is a laminate film.

12. A magnetoresistance effect head according to claim 11, wherein said laminate film includes one of a magnetic alloy layer of fcc crystal structure or an amorphous magnetic alloy layer.

13. A magnetoresistance effect head according to claim 1, wherein the other of said one of said first and second magnetic layers is contiguous with an antiferromagnetic layer.

14. A magnetoresistance effect head according to claim 1, wherein said magnetic Co-alloy is a CoFe alloy.

15. A magnetoresistance effect head according to claim 14, wherein said CoFe alloy has a composition of about $Co_{90}Fe_{10}$.

16. A magnetoresistance effect head comprising:

a spin valve film having a laminate construction consisting of three layers and including:

a first magnetic layer having a thickness $d_1$, a second magnetic layer having a thickness $d_2$, one of said first and second magnetic layers having a direction of magnetization varied by an external magnet, and a nonmagnetic intermediate layer interposed between said first and second magnetic layers; and a soft magnetic layer forming a magnetic exchange coupling with said one of said first and second magnetic layers and having a higher resistance than said one of said first and second magnetic layers, wherein said first and second magnetic layers are made of a magnetic Co-alloy, said one of said first and second magnetic layers and said soft magnetic layer have a total thickness of $d_f$, and the following expressions are satisfied: $1 nm \leq d_1 \leq 7$ nm, $1 nm \leq d_2 \leq 7$ nm, $d_1 \geq d_2$, $0 \leq (d_1-d_2) / d_1 \leq 0.40$, and $5 nm \leq d_f \leq 40$ nm.

* * * * *

UNITED STATES PATENT AND TRADEMARK OFFICE
CERTIFICATE OF CORRECTION

PATENT NO. : 5,585,199
DATED : December 17, 1997
INVENTOR(S) : Yuzo KAMIGUCHI et al.

It is certified that error appears in the above-indentified patent and that said Letters Patent is hereby corrected as shown below:

Claim 1, column 16, line 49, "$1 \text{ nm} \leq d_2 7 \text{ nm}$" should read --$1 \text{ nm} \leq d_2 \leq 7 \text{ nm}$--.

Signed and Sealed this

Tenth Day of June, 1997

Attest:

Attesting Officer

BRUCE LEHMAN

Commissioner of Patents and Trademarks